(12) United States Patent
Conliffe

(10) Patent No.: US 9,848,260 B2
(45) Date of Patent: Dec. 19, 2017

(54) WEARABLE COMMUNICATION ENHANCEMENT DEVICE

(71) Applicant: Nuance Communications, Inc., Burlington, MA (US)

(72) Inventor: Iain A. Conliffe, Roslindale, MA (US)

(73) Assignee: Nuance Communications, Inc., Burlington, MA (US)

( * ) Notice: Subject to any disclaimer, the term of this patent is extended or adjusted under 35 U.S.C. 154(b) by 105 days.

(21) Appl. No.: 14/035,142

(22) Filed: Sep. 24, 2013

(65) Prior Publication Data

US 2015/0088500 A1  Mar. 26, 2015

(51) Int. Cl.
*G10L 21/06* (2013.01)
*H04R 1/32* (2006.01)
(Continued)

(52) U.S. Cl.
CPC ............ *H04R 1/32* (2013.01); *G02C 11/10* (2013.01); *H04R 1/10* (2013.01); *H04R 1/406* (2013.01); *H04R 3/005* (2013.01); *G06F 3/013* (2013.01); *G06K 9/00288* (2013.01); *G10L 15/26* (2013.01); *G10L 21/0208* (2013.01);
(Continued)

(58) Field of Classification Search
None
See application file for complete search history.

(56) References Cited

U.S. PATENT DOCUMENTS 6,002,776 A * 12/1999 Bhadkamkar ........ G10K 11/178
379/406.16
6,010,216 A * 1/2000 Jesiek .................... H04B 1/385
351/158
(Continued)

FOREIGN PATENT DOCUMENTS

CA   2297344 A1   9/2000
CN   105765486 A  7/2016
(Continued)

OTHER PUBLICATIONS

Hidri Adel, Meddeb Souad, Abdulqadir Alaqeeli, Amiri Hamid, "Beamforming Techniques for Multichannel audio Signal Separation," International Journal of Digital Content Technology and its Applications, vol. 6, No. 20, pp. 659-667, 2012.*
(Continued)

*Primary Examiner* — Richard Zhu
(74) *Attorney, Agent, or Firm* — Brian J. Colandreo; Michael T. Abramson; Holland & Knight LLP

(57) ABSTRACT

Embodiments disclosed herein may include a wearable apparatus including a frame having a memory and processor associated therewith. The apparatus may include a camera associated with the frame and in communication with the processor, the camera configured to track an eye of a wearer. The apparatus may also include at least one microphone associated with the frame. The at least one microphone may be configured to receive a directional instruction from the processor. The directional instruction may be based upon an adaptive beamforming analysis performed in response to a detected eye movement from the infrared camera. The apparatus may also include a speaker associated with the frame configured to provide an audio signal received at the at least one microphone to the wearer.

17 Claims, 8 Drawing Sheets

(51) Int. Cl.
| | |
|---|---|
| *H04R 1/10* | (2006.01) |
| *G02C 11/00* | (2006.01) |
| *H04R 1/40* | (2006.01) |
| *H04R 3/00* | (2006.01) |
| *G10L 15/26* | (2006.01) |
| *G06K 9/00* | (2006.01) |
| *G06F 3/01* | (2006.01) |
| *H04R 25/00* | (2006.01) |
| *G10L 21/0216* | (2013.01) |
| *G10L 21/0208* | (2013.01) |
| *G10L 15/22* | (2006.01) |

(52) U.S. Cl.
CPC ............... *G10L 2015/221* (2013.01); *G10L 2021/02082* (2013.01); *G10L 2021/02166* (2013.01); *H04R 25/00* (2013.01); *H04R 2225/41* (2013.01); *H04R 2430/25* (2013.01)

(56) References Cited

U.S. PATENT DOCUMENTS

| | | | | |
|---|---|---|---|---|
| 6,148,087 | A * | 11/2000 | Martin | G02C 5/143 381/23.1 |
| 7,286,674 | B2 * | 10/2007 | Karjalainen | H04R 3/04 381/66 |
| 8,482,859 | B2 | 7/2013 | Border et al. | |
| 2004/0210444 | A1 * | 10/2004 | Arenburg et al. | 704/277 |
| 2007/0112571 | A1 | 5/2007 | Thirugnana | |
| 2010/0074460 | A1 * | 3/2010 | Marzetta | 381/313 |
| 2010/0135500 | A1 * | 6/2010 | Derleth | H04R 25/552 381/23.1 |
| 2011/0058676 | A1 * | 3/2011 | Visser | 381/17 |
| 2011/0096941 | A1 * | 4/2011 | Marzetta et al. | 381/92 |
| 2012/0078628 | A1 * | 3/2012 | Ghulman | 704/235 |
| 2012/0212399 | A1 | 8/2012 | Border et al. | |
| 2013/0044128 | A1 * | 2/2013 | Liu et al. | 345/633 |
| 2013/0044130 | A1 * | 2/2013 | Geisner et al. | 345/633 |
| 2013/0235347 | A1 * | 9/2013 | Hennessey | G06F 3/013 351/210 |
| 2013/0329183 | A1 * | 12/2013 | Blum et al. | 351/158 |
| 2014/0369537 | A1 * | 12/2014 | Pontoppidan et al. | 381/314 |

FOREIGN PATENT DOCUMENTS

| | | |
|---|---|---|
| EP | 3049893 A1 | 8/2016 |
| JP | 2012059121 A | 3/2012 |
| WO | 2015047593 A1 | 4/2015 |

OTHER PUBLICATIONS

EAP Habets and S. Gannot, "Dual-microphone speech dereveration using a reference signal", International Conference on Acoustics, Speech and Signal Processing 2007. Cited in applicant's specification, US 2015/0088500 A1 at paragraph 40.*

Notification of Transmittal of the International Search Report and the Written Opinion of the International Searching Authority, or the Declaration issued in corresponding International Application No. PCT/US2014/051491, dated Nov. 18, 2014 (12 pages).

Notification Concerning Transmittal of International Preliminary Report on Patentability in corresponding International Application No. PCT/US2014/051491, dated Apr. 7, 2016 (8 pages).

Supplementary European Search Report issued in counterpart Application Serial No. 14848719.2 dated Apr. 24, 2017.

* cited by examiner

US 9,848,260 B2

WEARABLE COMMUNICATION ENHANCEMENT DEVICE

TECHNICAL FIELD

This disclosure relates to communication aids and, more particularly, to a wearable device capable of enhancing communication between one or more people.

BACKGROUND

Today's hearing aids generally increase the volume on everything in proximity to the user. As a result, crowded areas or areas having a number of different sounds tend to be extremely unpleasant for the wearer. Further, current hearing aids often generate feedback when other people speak near the wearer's ear. These types of issues often result in the wearer resorting to lip reading or alternative sub-optimal techniques.

SUMMARY OF DISCLOSURE

In one implementation, a wearable apparatus, in accordance with this disclosure, may include a frame having a memory and processor associated therewith. The apparatus may include a camera associated with the frame and in communication with the processor, the camera configured to track an eye of a wearer. The apparatus may also include at least one microphone associated with the frame, the at least one microphone configured to receive a directional instruction from the processor, the directional instruction based upon, at least in part, an adaptive beamforming analysis performed in response to a detected eye movement from the infrared camera. The apparatus may further include a speaker associated with the frame configured to provide an audio signal received at the at least one microphone to the wearer.

One or more of the following features may be included. In some embodiments, the processor may be configured to convert the audio signal to text. The apparatus may also include at least one lens configured to receive the text results from the processor and to provide the text to the wearer. The apparatus may further include a facial recognition camera associated with the frame, the facial recognition camera configured to identify a non-wearer of the apparatus. In some embodiments, the speaker may be included within at least one headphone in communication with the processor. In some embodiments, the memory may be configured to store at least one of contact information and conversation log files based upon the converted text. The directional instruction may be based upon, at least in part, an identification of a non-wearer of the apparatus. The identification of the non-wearer of the apparatus may be performed based upon an eye movement of the wearer. The identification of the non-wearer of the apparatus may be performed based upon receiving an input from an input device associated with the frame. In some embodiments, the at least one lens may be configured to display visual feedback to the wearer, the visual feedback including at least one of beam shape, beam direction, and an identified non-wearer of the apparatus.

In another implementation, a method is provided. The method may include tracking an eye of a wearer using a camera associated with a frame, the frame having a processor and a memory associated therewith. The method may also include receiving a directional instruction from the processor at a microphone associated with the frame, the directional instruction based upon, at least in part, an adaptive beamforming analysis performed in response to a detected eye movement from the camera. The method may further include adjusting a direction of the microphone, based upon the directional instruction, receiving an audio signal at the at least one microphone and providing the audio signal to the wearer using a speaker associated with the frame.

One or more of the following features may be included. In some embodiments, the method may include converting, using the processor, the audio signal to text. The method may also include receiving the text results from the processor and providing the text to the at least one lens. The method may further include identifying a non-wearer of the apparatus using a facial recognition camera associated with the frame. In some embodiments, the speaker may be included within at least one headphone in communication with the processor. The method may also include storing at least one of contact information and conversation log files based upon the converted text in the memory. In some embodiments, the directional instruction may be based upon, at least in part, an identification of a non-wearer of the apparatus. The identification of the non-wearer of the apparatus may be performed based upon an eye movement of the wearer. The identification of the non-wearer of the apparatus may be performed based upon receiving an input from an input device associated with the frame. The method may further include displaying visual feedback to the wearer at the at least one lens, the visual feedback including at least one of beam shape, beam direction, and an identified non-wearer of the apparatus.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings may indicate like elements.

DETAILED DESCRIPTION OF THE EMBODIMENTS

Embodiments provided herein are directed towards a wearable device that may assist the user in communicating with other individuals. Some embodiments may include an assistive wearable device that may utilize eye-tracking to direct acoustic beamforming for the purpose of directed speech recognition. Some embodiments may also provide real-time closed captioning, as well as enhanced and amplified audio, to the wearer. In this way, embodiments of the present disclosure may allow deaf or hard of hearing people to communicate more easily than existing hearing aids.

Figure 1:
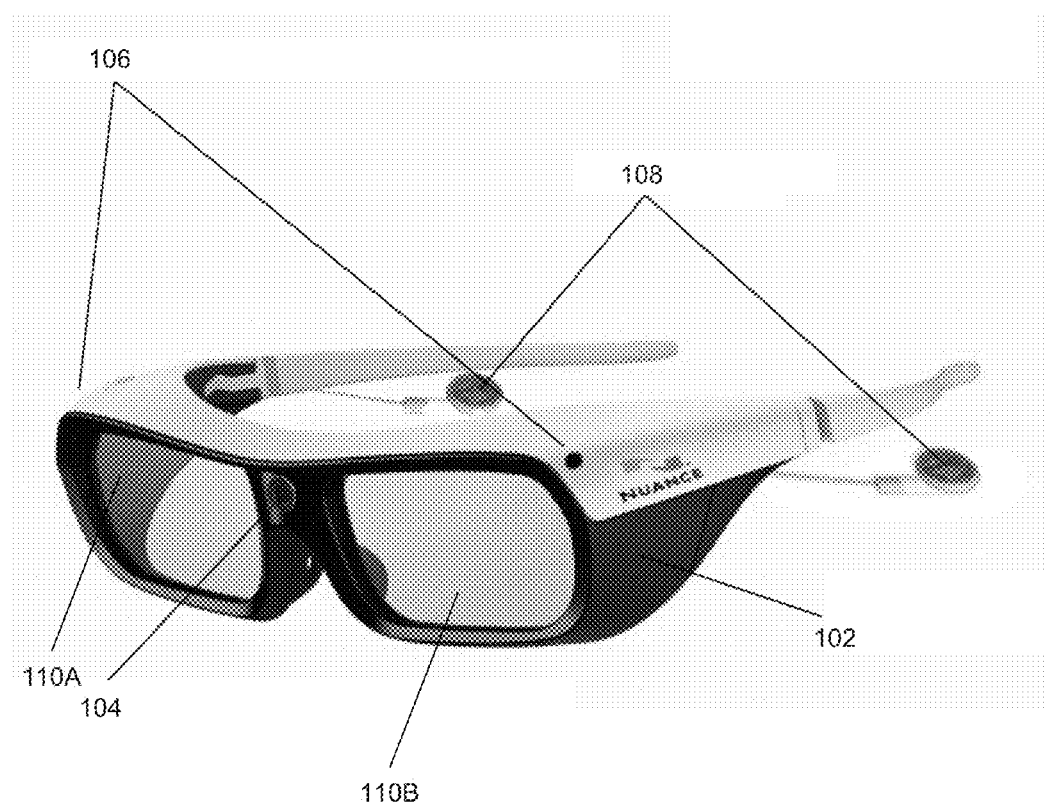
FIG. 1 is a diagrammatic view of a wearable apparatus in accordance with an embodiment of the present disclosure.

Referring to FIG. 1, there is shown an embodiment depicting a wearable communication apparatus 100 in accordance with the present disclosure. Apparatus 100 may include a frame 102 having numerous components associated therewith. As shown in FIG. 1 some components may include, but are not limited to, front facing camera 104, at least one microphone 106, one or more speakers 108, transparent lenses 110a and 110b, and rearward facing camera (shown in FIG. 2). Frame 102 may include at least one memory and processor onboard that may be configured to communicate with some or all of the components associated with frame 102. Frame 102 may be constructed out of any suitable material and may be configured to be worn on the head of a user as indicated by FIG. 1.

In some embodiments, frame 102 may include a front facing camera 104. Front facing camera 104 may be embedded within frame 102 and may be in communication with the onboard processor associated with apparatus 100. Front facing camera 104, in conjunction with the onboard processor and memory, may include facial recognition capabilities. Accordingly, front facing camera 104 may be configured to identify a wearer and/or non-wearer of the apparatus.

In some embodiments, the facial recognition capabilities of apparatus 100 may be combined with voice biometrics, which may allow the system to recognize who was speaking and pair it with personal information. For example, if the wearer was speaking to a person saved in his/her contacts, this voice/face may be paired with their contact information. Additionally and/or alternatively, if it is a person the wearer has previously spoken to but not saved, apparatus 100 may prompt the wearer to save their information. In some embodiments, apparatus 100 may be configured to recognize when the person has introduced themselves, and ask the wearer to confirm that he/she would like to save that information. This option may be provided using the closed captioning option described herein, using the speakers, and/or any other suitable approach.

Figure 2:
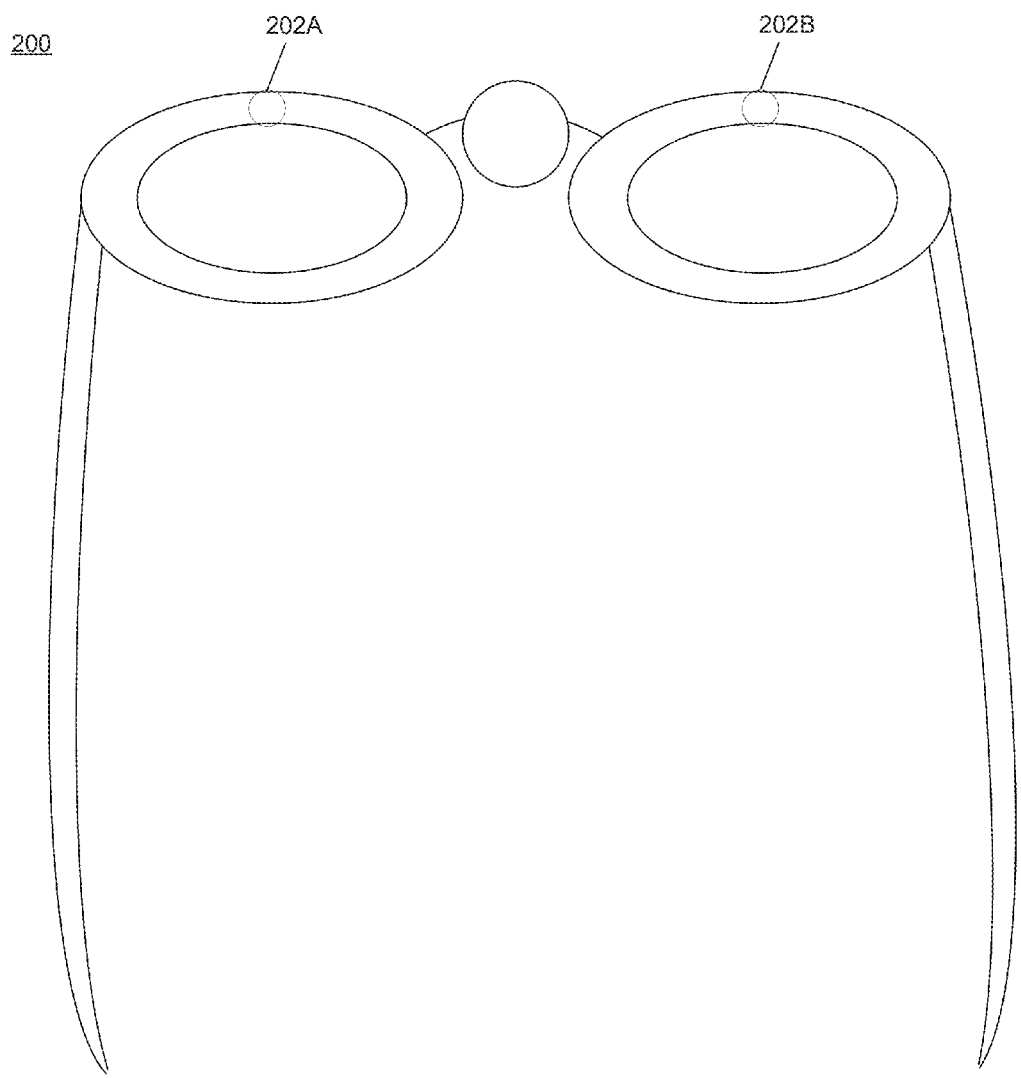
FIG. 2 is a diagrammatic view of a wearable apparatus in accordance with an embodiment of the present disclosure.

Referring also to FIG. 2, an embodiment of a wearable apparatus 200 is shown. Wearable apparatus 200 may include any or all of the components discussed with reference to FIG. 1. Additionally and/or alternatively, wearable apparatus 200 may include one or more cameras 202A and 202B (e.g. infrared cameras), which may be associated with frame 102 and in communication with the onboard processor. In some embodiments, infrared cameras 202A and 202B may be configured to track the eye of the wearer of the apparatus. The term "camera" as used herein may refer to its ordinary meaning as well as to any device that may be used to track the movement of an object and/or to provide video with regard to a particular target.

In some embodiments, frame 102 may include one or more microphones 106. Although, two microphones are depicted in FIG. 1 any number of microphones may be used without departing from the scope of the present disclosure. Microphones 106 may be configured to receive speech input signals from one or more individuals and/or alternative input signal sources within the range of apparatus 100. Some alternative input sources may include, but are not limited to, televisions, radios, cellphones, and/or any other source of sound. Microphone 106 may also be in communication with the onboard processor and may be configured to receive one or more instructions from the processor. In some embodiments, this directional instruction may be based upon an adaptive beamforming analysis performed by the processor, which may occur in response to a detected eye movement from infrared camera 202A and/or 202B. The directional instruction may be configured to result in an adjustment at microphone 106. The concept of beamforming is discussed in further detail below with reference to FIGS. 3-5.

In some embodiments, an identification of the non-wearer of the apparatus may be performed based upon an input from front facing camera 104 and may be based upon the user selecting the non-wearer as the person of interest or the person's whose speech the wearer is interested in focusing upon (e.g. using an eye movement, audible selection, physical button selection, etc.). Additionally and/or alternatively, the identification of the non-wearer of the apparatus may be performed based upon receiving an input from an input device associated with the frame. In some embodiments, at the wearer's option, a directional instruction may be sent to microphones 106 based upon this identification and selection.

In some embodiments, frame 102 may also include one or more speakers 108 as shown in FIG. 1. Speakers 108 may be associated with frame 102 and may be configured to provide an audio signal received at microphone 106 to the wearer. In some embodiments, the audio signals may undergo processing prior to output at speakers 108. Speakers 108 may be included within a headphone that may be in communication with the processor. Any suitable speaker may be used without departing from the scope of the present disclosure, including, but not limited to, the ear-bud speakers depicted in FIG. 1. In some embodiments, speakers 108 may be connected with frame 102 using any suitable approach, for example, using an audio jack, hardwired, and/or other connection.

In some embodiments, speakers 108 may be configured to synchronize with apparatus 100, and may include a programmable equalizer capable of calibration, which may allow the user the option of adjusting one or more settings such as altering the low end frequencies, boosting the midrange, etc. Accordingly, apparatus 100 may be configured to periodically administer quick hearing tests to recalibrate itself as the wearer's hearing may deteriorate over time.

In some embodiments, the onboard processor may be configured to receive the input signals from microphones 106. The received input signals may be processed and transmitted to speakers 108 for the benefit of the wearer. Additionally and/or alternatively, the onboard processor may convert the received audio signal to text for the wearer to read, thus providing a closed-captioning functionality an example of which is depicted in FIG. 6 discussed below.

Figure 6:
FIG. 6 is a diagrammatic view of a display generated by a wearable apparatus in accordance with an embodiment of the present disclosure.

FIG. 6 depicts an embodiment of the wearable apparatus that shows a display as viewed by the wearer through lens 110A/B. As discussed above, lenses 110A/B may be configured to receive the text results from the processor and to provide the text to the wearer via a display visible to the wearer. Lenses 110A/B may include transparent or partially transparent screens that allow the user to view their surroundings while also providing the closed-captioning feedback shown in FIG. 6. In some embodiments, lenses 110A/B may be configured to display various types of visual feedback to the wearer, for example, via the display shown in FIG. 6. The visual feedback may include, but is not limited to, beam shape, beam direction, and the identification of the non-wearer of the apparatus.

As discussed above, frame 102 may include one or more memory devices associated therewith. Some suitable memory types may include, but are not limited to, hard disk drives, tape drives, optical drives, RAID devices, random access memories (RAM), read-only memories (ROM), and all forms of flash memory storage devices. For example, in some embodiments, frame 102 may include onboard flash memory, which may be configured to store contact information and to save encrypted conversation log files. Additionally and/or alternatively, wearable apparatus 100 may be in communication with a configurable amount of cloud storage, which may allow for the offloading of various types of data. Some representative types of data may include, but are not limited to, saved chat logs and backup contact information.

In some embodiments, apparatus 100 may include various types of speech recognition software, which may be executed in whole or in part by the onboard processor. Additionally and/or alternatively, apparatus 100 may be in communication with one or more server devices that may perform some or all of the speech recognition operations. Accordingly, apparatus 100 may use speech recognition to intelligently categorize elements of the conversation. Some elements capable of being categorized may include, but are not limited to, things, events, places, people, or any other category/type designation created or discovered by the software.

Figure 3:
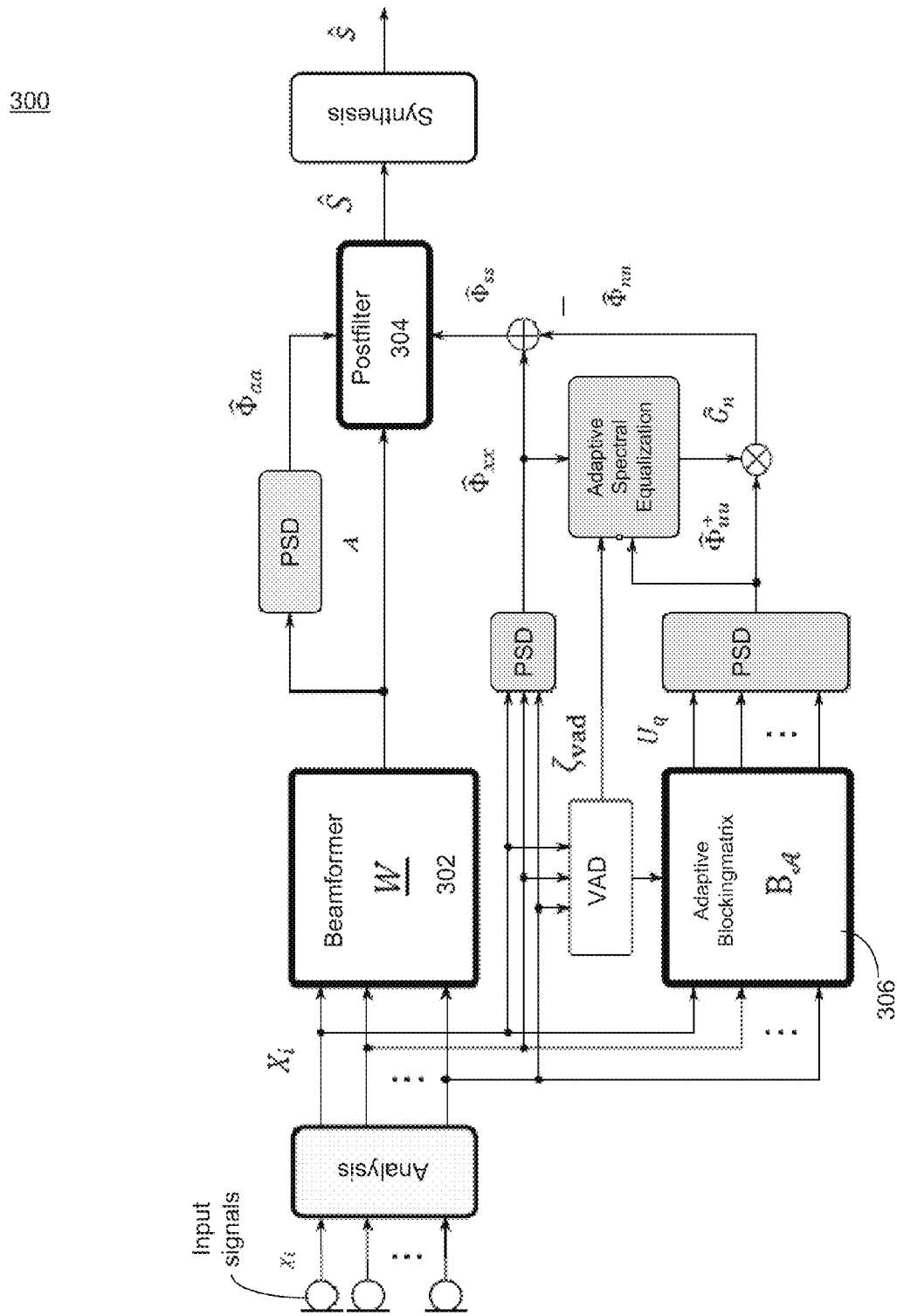
FIG. 3 is a block diagram of a beamformer that may be used in accordance with an embodiment of the present disclosure.

Referring now to FIG. 3, an embodiment of a beamforming system 300 including both a beamformer and a postfilter is provided. As discussed above, the systems of FIGS. 3-5 may employ various beamforming techniques, which may be configured to generate one or more directional instructions that may be received by microphones 106 and may be used to focus upon a particular speaker or source of sound. System 300 may be associated with one or microphones such as those described above and may be incorporated within apparatus 100. In some embodiments, system 300 may be configured to receive one or more audio signals such as those described above. System 300 may include beamformer 302 and postfilter 304 as well as a number of other processing components and circuitry types, such as those discussed below. In some embodiments, processing of audio signals may occur in beamformer 302, postfilter 304, adaptive blocking matrix 306, etc.

The term "Beamforming", as used herein, may generally refer to a signal processing technique used in sensor arrays for directional signal transmission or reception. Beamforming methods may be used for background noise reduction in a variety of different applications. A beamformer such as beamformer 302, may be configured to process signals emanating from a microphone array to obtain a combined signal in such a way that signal components coming from a direction different from a predetermined wanted signal direction are suppressed. Microphone arrays, unlike conventional directional microphones, may be electronically steerable which gives them the ability to acquire a high-quality signal or signals from a desired direction or directions while attenuating off-axis noise or interference. It should be noted that the discussion of beamforming is provided merely by way of example as the teachings of the present disclosure may be used with any suitable signal processing method.

In some embodiments, beamforming may provide a specific directivity pattern for a microphone array. In the case of, for example, delay-and-sum beamforming (DSBF), beamforming encompasses delay compensation and summing of the signals. Due to spatial filtering obtained by a microphone array with a corresponding beamformer, it is often possible to improve the signal to noise ratio ("SNR"). However, achieving a significant improvement in SNR with simple DSBF requires an impractical number of microphones, even under idealized noise conditions. Another beamformer type is the adaptive beamformer. Traditional adaptive beamformers optimize a set of channel filters under some set of constraints. These techniques do well in narrowband, far-field applications and where the signal of interest generally has stationary statistics. However, traditional adaptive beamformers are not necessarily as well suited for use in speech applications where, for example, the signal of interest has a wide bandwidth, the signal of interest is non-stationary, interfering signals also have a wide bandwidth, interfering signals may be spatially distributed, or interfering signals are non-stationary. A particular adaptive array is the generalized sidelobe canceller (GSC). The GSC uses an adaptive array structure to measure a noise-only signal which is then canceled from the beamformer output. However, obtaining a noise measurement that is free from signal leakage, especially in reverberant environments, is generally where the difficulty lies in implementing a robust and effective GSC. An example of a beamformer with a GSC structure is described in L. J. Griffiths & C. W. Jim, "An Alternative Approach to Linearly Constrained Adaptive Beamforming", in *IEEE Transactions on Antennas and Propagation*, 1982 pp. 27-34.

In T. Wolff and M. Buck, "A Generalized View on Microphone Array Postfilters", *Proc. International Workshop on Acoustic Echo and Noise Control (IWAENC)*, Tel Aviv, Israel, 2010, a postfilter transfer function is described that generalizes some known post-filters such as those proposed by Zelinski, Simmer, McCowan, Leukimmiatis etc. A generalized postfilter is provided below:

$$H_{pf} = \max\left[\frac{\Phi_{xx}}{\Phi_{aa}}\left(1 - \frac{tr\{BJ_{xx}B^H\}}{tr\{BJ_{nn}B^H\}}\right)\frac{G_{bm}}{G_{bm}-1}, 0\right] \quad \text{Equation 1}$$

Here, $\Phi_{xx}$ denotes the power spectral density (PSD) at the microphones and $\Phi_{aa}$ is the PSD at the beamformer output. The term in the middle determines the spatial characteristic of the filter as it depends on the coherence matrix of the entire sound field $J_{xx}$ as well as the one of the noise $J_{nn}$. The matrix B can be designed to match the postfilter to any given beamformer: If B is orthogonal to the LCMV constraint matrix $C_{bf}$ hence $BC_{bf}=0$, then B becomes a blocking matrix and the postfilter implements the same constraints as the beamformer. The third part of the transfer function denotes the influence of the blocking matrix gain $G_{bm}$. For further details please see T. Wolff and M. Buck, "A Generalized View on Microphone Array Postfilters", *Proc. International Workshop on Acoustic Echo and Noise Control (IWAENC)*, Tel Aviv, Israel, 2010.

As discussed above, in some embodiments, beamformer-postfilter system 300 may consist of an arbitrary beamformer 302, a blocking matrix 306 and an adaptive postfilter 304. Postfilter 304 may be ideally matched to beamformer 302 if the blocking matrix constraint is identical to the beamformer constraint: $C_{pf}=C_{bf}$. If this holds, the blocking matrix may reject all those signal components that are kept undistorted by the beamformer.

Equation 1 states that the sum of all PSDs at the blocking matrix output $\Phi_{uu}^+=tr\{B\Phi_{xx}B^H\}$ may be computed first. For an ideal blocking matrix, this PSD may not contain any desired speech components anymore, because they have been rejected by the blocking matrix (blocked). Practically, however, the reverberation does pass the blocking matrix, because it does not impinge from the steering direction of the beamformer (diffuse sound). Therefore we observe noise as well as reverberation at the blocking matrix output. According to Equation 1 this PSD ($\Phi_{uu}^+$) has to be equalized by $$G_n = tr\{BJ_{nn}B^H\}^{-1} = \Phi_{nn}/\Phi_{uu}^+ \qquad \text{Equation 2}$$

to make up for the coloration introduced through the blocking matrix B. Here, $\Phi_{nn}$ is the noise-PSD at the microphones. The resulting noise estimate may then be subtracted from the input PSD $\Phi_{xx}$ to obtain the PSD of the desired speech $\Phi_{ss} = \Phi_{xx} - \Phi_{nn}$. Together with the PSD at the beamformer output $\Phi_{aa}$, the optimal postfilter $H_{pf}$ can be computed.

The equalizer $G_n$, however, is not known in general and must therefore be estimated. Classical postfilters such as the one proposed by Zelinski or McCowans Postfilter, do so by using a Model $\hat{J}_{nn}$ for the noise coherence function. For example, an uncorrelated noise field or a diffuse noise field is assumed. These models result in a certain equalizer for the noise $G_n$. Practically, both assumptions do generally not coincide with real noise fields, so the noise estimators will be biased. As a consequence, the respective filters are not optimal under practical conditions, which means that either the noise is not suppressed or the filter will be too aggressive and suppresses speech. Therefore, it has been proposed in T. Wolff and M. Buck, "A Generalized View on Microphone Array Postfilters", *Proc. International Workshop on Acoustic Echo and Noise Control (IWAENC)*, Tel Aviv, Israel, 2010, to estimate the equalization filter $G_n$ adaptively. This is typically achieved by temporal averaging of $\Phi_{nn}/\Phi_{uu}^+$ during speech pauses and provides an unbiased estimate for the noise PSD which improves the performance with respect to the noise. To find the speech pauses it is necessary to use voice activity detection (VAD), which can be implemented similar to the spatial VAD proposed in O. Hoshuyama and A. Sugiyama, "Robust Adaptive Beamforming", *Microphone Arrays*, Springer, Berlin, Heidelberg, NY (2001).

A similar reasoning holds for the speech, i.e., if the complex coherence function of the desired speech component is not considered correctly, the postfilter leads to undesired speech distortion. One way to minimize them is to use an adaptive implementation of the blocking matrix as proposed in O. Hoshuyama and A. Sugiyama, "Robust Adaptive Beamforming", *Microphone Arrays*, Springer, Berlin, Heidelberg, NY (2001), for instance. The blocking matrix gain $G_{bm}$ in Equation 1 is then typically considered to be infinite, so there is no need to estimate it (see also T. Wolff and M. Buck, "Influence of Blocking Matrix Design on Microphone Array Postfilters", *Proc. International Workshop on Acoustic Echo and Noise Control (IWAENC)*, Tel Aviv, Israel, 2010. As a consequence, the residual speech that practically still passes the blocking matrix is treated as interference which results in a dereverberating effect.

Even with an adaptive blocking matrix it is desired to better control the dereverberation effect of the postfilter. The filter as described so far does not offer any possibility to control the dereverberation explicitly. The reason for this is that the equalizer $G_n$ is designed to match the noise field—not the reverberation.

The problem of protecting the direct sound from undesired distortions is discussed somewhat in E. A. P. Habets and S. Gannot, "Dual-microphone Speech Dereverberation Using a Reference Signal", *International Conference on Acoustics, Speech and Signal Processing (ICASSP '07)*, Honolulu, Hi., 2007. The main idea proposed there is to delay the PSD at the blocking matrix output $\Phi_{uu}$ by a few frames D $$\Phi_{uu}(k,\mu) \rightarrow \Phi_{uu}(k-D,\mu) \qquad \text{Equation 3}$$

and match it to the noise PSD at the beamformer output (note this is in the current frame). The "matching" may be performed using a gradient algorithm to find the respective mapping. Since the "noise reference spectrum" $\Phi_{uu}$ is delayed (hence does not yet contain the reverb in the current frame) the resulting postfilter exhibits enhanced robustness with respect to distortion of the direct sound. The delaying, however, turns the simple relation between $\Phi_{uu}(k,\mu)$ and the noise PSD at the beamformer output (just a time-invariant equalizer) into a rather complex relation that depends on signal properties. Also, the proposed method neither offers a way to achieve stronger suppression of the reverberation, not offers it a way to control the direct sound distortions explicitly.

Embodiments of acoustic beamforming process 10 may be configured to implement a beamformer with a spatial postfilter. Both, the beamformer as well as the spatial postfilter may be configured to suppress the reverberation as these algorithms focus on the desired speaker spatially. The reverberation typically hits the microphones from other directions (diffuse soundfield). Putting a spatial focus in the direction of the speaker therefore suppresses the reverb. Hence, the reverberation may act as an interfering signal.

Figure 4:
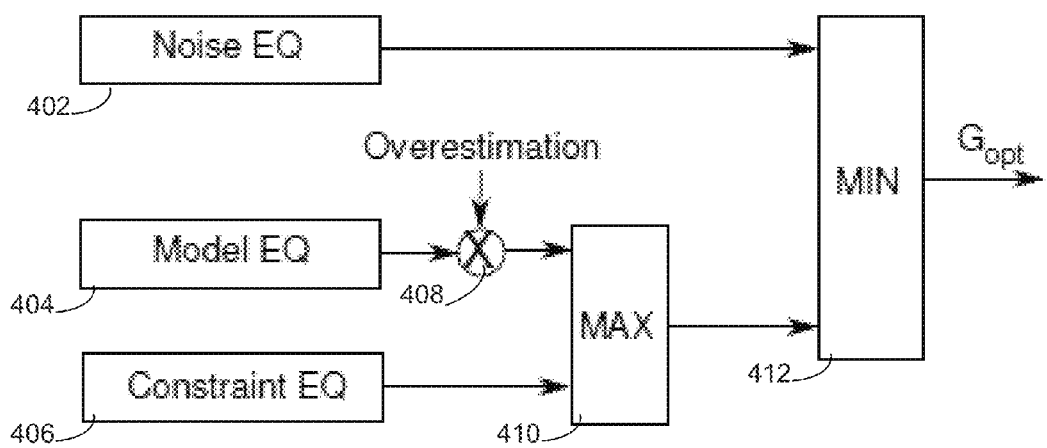
FIG. 4 is a block diagram of an equalization system that may be used in accordance with an embodiment of the present disclosure.

Referring now to FIG. 4, an embodiment of a model based equalization system 400, which may be used with acoustic beamforming process 10 is provided. As discussed above, acoustic beamforming process 10 may include limiting a model based reverberation equalizer using a temporal constraint for direct sound distortions. The model based reverberation equalizer may be configured to generate one or more outputs, based upon, at least in part, at least one of the first audio signal and the reverberation audio signal. In this way, in order to optimize the postfilter's behavior with respect to reverberation, acoustic beamforming process 10 may incorporate an equalization filter $G_{opt}(k,\mu)$ instead of $G_n(k,\mu)$. Accordingly, acoustic beamforming process 10 may utilize a model based equalization that results from the coherence function of diffuse sound, overestimate it and impose an upper limit (e.g. Constraint-EQ 406) that limits the distortion of the direct sound components. The latter is achieved by ensuring a minimum required direct-to-noise ratio (DNR) as is shown in FIG. 4.

In some embodiments, the model based reverberation equalizer may be configured to increase a level of suppression of reverberation by a spatial postfilter (e.g. postfilter 304). The model based reverberation equalizer may also be configured to limit some or all of the distortion of the direct sound and enable spatial filtering at the postfilter.

In some embodiments, acoustic beamforming process 10 may include receiving one or more outputs from the model based reverberation equalizer at a postfilter such as postfilter 304 shown in FIG. 3. Postfilter 304 may also receive a beamformer output, for example, from beamformer 302.

If the equalizer is designed for the diffuse noise field, the resulting postfilter may be too aggressive in the lower frequencies because the coherence functions of the direct sound and the diffuse sound may not differ greatly. Therefore, both may be suppressed. Applying the diffuse soundfield model may not produce an optimal solution in the lower frequencies.

In the higher frequencies, the diffuse soundfield model differs greatly from the coherent direct soundfield and therefore the spatial postfilter works well and leads to the suppression of reverberation. From the viewpoint of de-reverberation, the performance could practically be enhanced though (a higher suppression of reverb may be desired.). A higher suppression of the reverberation could simply be achieved by overestimating the noise PSD. This, however, may lead to undesired distortions of the desired signal components (direct sound). To what degree those will be distorted depends on the DNR.

Figure 5:
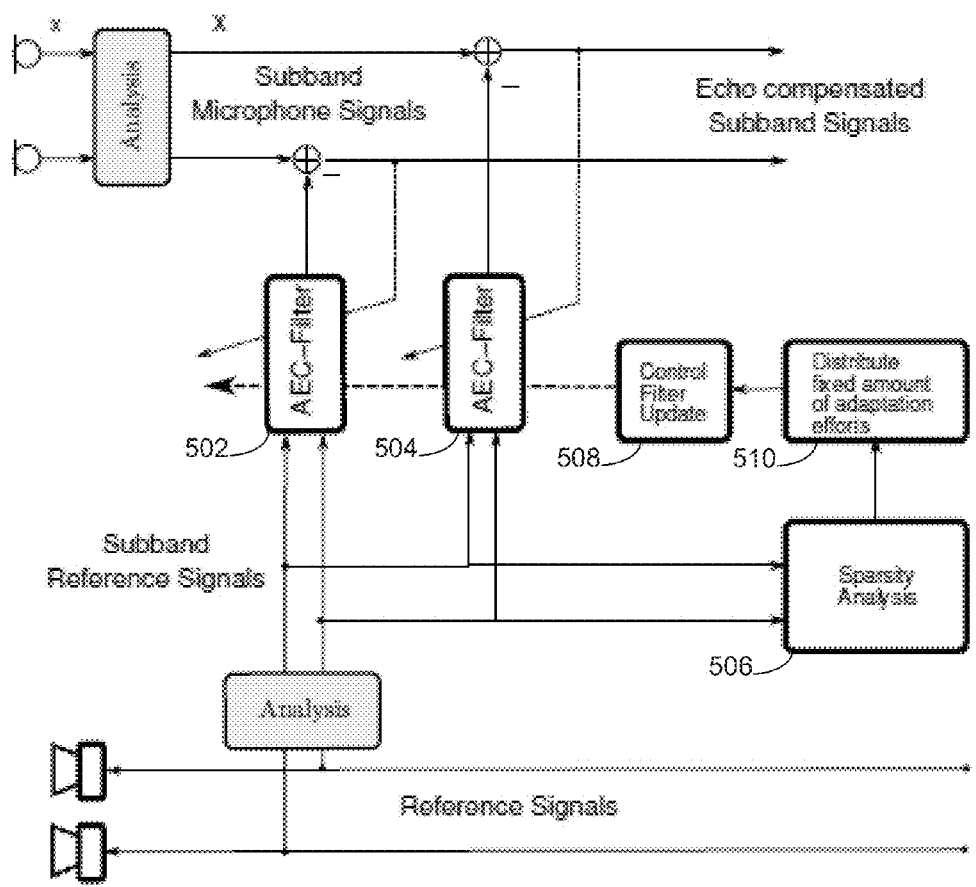
FIG. 5 is a block diagram of an acoustic echo cancellation system that may be used in accordance with an embodiment of the present disclosure.

Referring now to FIG. 5, an embodiment of a system 500 configured to implement an acoustic echo cancellation process, which may be associated with wearable apparatus 100 is provided. System 500 may include a number of filters 502, 504. Filters 502, 504 may be of any suitable design, for example, adaptive acoustic filters as are discussed in further detail below. System 500 may further include sparsity analysis module 506, control filter update module 508, and constraint module 510. Sparsity analysis module 506 may be configured to apply at least one sparse update to one or more of filters 502, 504. In some embodiments, system 500 may update one or more sub-band adaptive filters based upon a multi-dimensional sparsity analysis as is discussed in further detail below. System 500 may be configured to remove any echo component associated with the received audio reference signals as shown in FIG. 5.

In some embodiments, system 500 may incorporate a multi-channel sub-band (frequency selective) AEC implementation. In this way, system 500 may be configured to analyze a level of signal energy of the audio reference signal with regard to time, frequency and audio channel to identify at least one maximum error contribution point. Accordingly, embodiments of system 500 may update only the points in the 3-D time-frequency-channel space that contribute the most to the error. Additionally and/or alternatively, system 500 may be configured to set a threshold amount of processing to some predefined amount.

In some embodiments, system 500 may analyze the multi-channel reference signals along time, frequency as well as across channels. Then, a function may be applied that determines how to allocate resources to the respective sub-bands and channels (e.g., in terms of the number of coefficients that are allowed to be updated). In this way, some filters (e.g., at a particular frequency and channel) may have no coefficients adapted at all, whereas others get only some of their coefficients renewed. Only those considered as most important, will get all their coefficients refreshed. An $\mathcal{L}$-Max approach may finally be used to decide which coefficients (e.g., at a given channel and sub-band) in particular will finally receive an update. Various $\mathcal{L}$-Max options may be available.

Referring again to FIG. 6, in some embodiments, in operation, the wearer of apparatus 100 may use his/her eyes to point at and/or designate a speaker (or otherwise control the direction of the beam) they wish to have recognized by apparatus 100. In this way, the wearer may designate a speaker by looking at them, and then immediately looking above and below them, which may be captured by rear-facing camera 202A and/or 202B. Additionally and/or alternatively, the wearer may designate a speaker by determining head or other body movements, and/or by looking at a speaker and pressing or otherwise activating a selection option (e.g. small button, voice activated control, etc.) on, or otherwise associated with, the device. Once a speaker has been designated, apparatus 100 may use employ front-facing camera 104 to track that person to keep them within the beam's focus and also to clarify and enhance their speech signal.

In some embodiments, the eye tracking capabilities discussed herein may include allowing the beam to follow the eye position of the wearer and/or to allow the wearer to use his/her eyes as a pointing device. For example, a wearer may focus the acoustic beam on an individual, may look at them and also "signal" that that person is the target (e.g., after the wearer looks at the person, by looking above them and below them. Additionally and/or alternatively, a wearer may use their eyes to point and then set the beam, as opposed to continually following the wearer's eye direction. This setting may help to avoid inadvertently resetting the beam if the wearer looks away.

In some embodiments, the beam may have different modes and settings. For example, the angle of the beam may be altered for different situations, including something that is basically all wide open for situations where the user wants to be able to hear all possible sounds surrounding them (e.g., crossing the street or riding a bicycle). Additionally and/or alternatively, multiple narrow beams may be used for small group conversations.

In some embodiments, apparatus 100 may be configured to clarify and enhance the speech signal for the wearer while also improving the accuracy of the speech recognition software running on apparatus 100. Apparatus 100 may provide real time captioning via the displays associated with lenses 110A/B, and may also store audio and/or textual transcriptions of conversations for reference or for querying later.

In some embodiments, apparatus 100 may be configured to utilize front-facing camera 104 to recognize the faces of speakers it records. Accordingly, apparatus 100 may associate this data with the speaker's voice-biometric data to generate an identity profile entry for that person, including contact information if available. In this way, the system may pair conversation log data with personal contact data, which may be stored in onboard memory, in network servers, or using any other suitable approach. This may assist in improving data quality for referencing later.

In some embodiments, apparatus 100 may further include an embedded voice assistant, so that a wearer may easily query their stored conversation logs using their voice (e.g., "At what time did David say we should meet? And at what location?"). The data may be stored on the device and/or accessible over a communications network.

In some embodiments, apparatus 100 may be configured to recognize when a person has introduced themselves, using language modeling and speech recognition. In this way, apparatus 100 may prompt the wearer to edit or save this information alongside the speaker's paired face/voice identity profile. For example, the voice assistant may remind the wearer via speakers 108 or the reminder may be presented in text via the display associated with lenses 110A/B.

In some embodiments, apparatus 100 may be configured with language packs for localization and translation. For example, a French speaking wearer may receive French captions, a Spanish speaking wearer Spanish captions, etc. These language packs may be paired with translational software so that a French-speaking wearer could listen to a Spanish-speaking person, and receive captioning in French. Additionally and/or alternatively, using front-facing camera 104 along with gesture modeling and recognition may allow apparatus 100 to translate sign language into captioning as well.

Referring again to FIG. 6, in some embodiments apparatus 100 may include various conversation modes, which may be selected and/or automatically triggered depending upon the environment. In addition to Normal/Automatic Mode, which is the default setting and which behaves as described above. These different modes may be used to specify the width of the beam as well as the intensity of the filtering and enhancement that may be applied to the audio signal before it is sent to the headphones and speech recognition software. In an Active Mode, a wide a beam as possible may be recorded. This may be particularly useful, for example, during times when it is important for the wearer to hear things around them, such as oncoming cars or police sirens. In a Music Mode, the wearer may be listening to music and the apparatus may operate so that the music is not canceled out via filtering. In a Large Room Mode, additional filters for Acoustic Echo Cancellation may be added to reduce echo and reverb on speakers 108 as well as to further minimize background noise. In a Manual Mode, the directed beam may be matched precisely to eye direction. For example, using a dial or digital interface for specifying beam width. This may be used for situations where the described modes do not apply and the wearer needs to have finer control over the shape and direction of the beam. Numerous modes may be used without departing from the scope of the present disclosure. Some of these may include, but are not limited to, music mode, study mode, party mode, etc. These modes may be programmable based on a time of day or via an application on the wearer's phone or via apparatus 100.

As discussed above, in some embodiments, apparatus 100 may include lenses 110A and/or 110B. In addition to captioning, lenses 110A and/or 110B may also display visual feedback to the wearer related to beam shape and direction, as well as identifying who the designated speaker is by name. If desired, a wearer may also have the speaker's name and/or personal information from their paired face/voice identity profile displayed along with their words as displayed in the captioning.

In some embodiments, apparatus 100 may provide privacy protections for both the wearer as well as those individuals with which the wearer has interacted. In this way, the conversation files stored by apparatus 100 may be encrypted using any suitable technique. For example, using a biometrically determined voice key that may be linked to the wearer's own voice. Accordingly, the stored conversation logs may only be accessible by the wearer of apparatus 100. Any conversation log files stored in the cloud may be similarly encrypted. Additionally and/or alternatively, the wearer may have the ability to delete some or all of the conversation history and go "off-the-record" at their option.

Although many of the examples discussed herein have focused upon the context of speech recognition it should be noted that the teachings of the present disclosure are not limited to these applications. For example, in some embodiments, front facing camera 104 of apparatus 100, in conjunction with the onboard processor, may be configured for gesture recognition in order to interpret sign language and then convert the interpreted sign language to closed captioning and/or voice translation through the speakers 108. The teachings of the present disclosure may also be applied to real-time translations. Accordingly, apparatus 100 may incorporate the speech-recognition engine inside the device into a translation engine. In this way, one user wearing the device could speak English, and another could speak French, and both could read what the other was saying in their selected language. As such, apparatus 100 may function as a universal translator.

Figure 7:
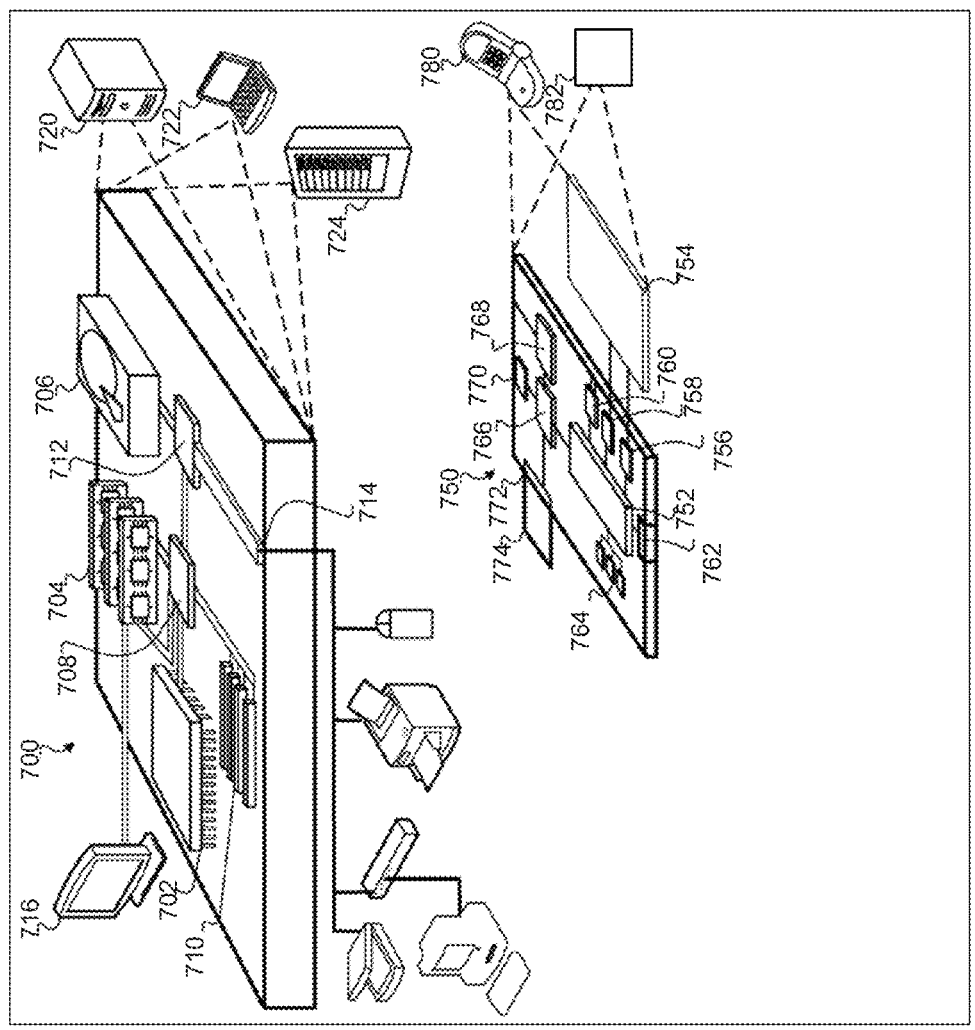
FIG. 7 is a diagrammatic view of a system configured to implement an acoustic beamforming process in accordance with an embodiment of the present disclosure.

Referring now to FIG. 7, an example of a generic computer device 700 and a generic mobile computer device 750, which may be used with the techniques described here is provided. Computing device 700 is intended to represent various forms of digital computers, such as tablet computers, laptops, desktops, workstations, personal digital assistants, servers, blade servers, mainframes, and other appropriate computers. In some embodiments, computing device 750 can include various forms of mobile devices, such as personal digital assistants, cellular telephones, smartphones, and other similar computing devices. Computing device 750 and/or computing device 700 may also include other devices, such as televisions with one or more processors embedded therein or attached thereto. The components shown here, their connections and relationships, and their functions, are meant to be exemplary only, and are not meant to limit implementations of the inventions described and/or claimed in this document.

In some embodiments, computing device 700 may include processor 702, memory 704, a storage device 706, a high-speed interface 708 connecting to memory 704 and high-speed expansion ports 710, and a low speed interface 712 connecting to low speed bus 714 and storage device 706. Each of the components 702, 704, 706, 708, 710, and 712, may be interconnected using various busses, and may be mounted on a common motherboard or in other manners as appropriate. The processor 702 can process instructions for execution within the computing device 700, including instructions stored in the memory 704 or on the storage device 706 to display graphical information for a GUI on an external input/output device, such as display 716 coupled to high speed interface 708. In other implementations, multiple processors and/or multiple buses may be used, as appropriate, along with multiple memories and types of memory. Also, multiple computing devices 700 may be connected, with each device providing portions of the necessary operations (e.g., as a server bank, a group of blade servers, or a multi-processor system).

Memory 704 may store information within the computing device 700. In one implementation, the memory 704 may be a volatile memory unit or units. In another implementation, the memory 704 may be a non-volatile memory unit or units. The memory 704 may also be another form of computer-readable medium, such as a magnetic or optical disk.

Storage device 706 may be capable of providing mass storage for the computing device 700. In one implementation, the storage device 706 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier is a computer- or machine-readable medium, such as the memory 704, the storage device 706, memory on processor 702, or a propagated signal.

High speed controller 708 may manage bandwidth-intensive operations for the computing device 700, while the low speed controller 712 may manage lower bandwidth-intensive operations. Such allocation of functions is exemplary only. In one implementation, the high-speed controller 708 may be coupled to memory 704, display 716 (e.g., through a graphics processor or accelerator), and to high-speed expansion ports 710, which may accept various expansion cards (not shown). In the implementation, low-speed controller 712 is coupled to storage device 706 and low-speed expansion port 714. The low-speed expansion port, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

Computing device 700 may be implemented in a number of different forms, as shown in the figure. For example, it may be implemented as a standard server 720, or multiple times in a group of such servers. It may also be implemented as part of a rack server system 724. In addition, it may be implemented in a personal computer such as a laptop computer 722. Alternatively, components from computing device 700 may be combined with other components in a mobile device (not shown), such as device 750. Each of such devices may contain one or more of computing device 700, 750, and an entire system may be made up of multiple computing devices 700, 750 communicating with each other.

Computing device 750 may include a processor 752, memory 764, an input/output device such as a display 754, a communication interface 766, and a transceiver 768, among other components. The device 750 may also be provided with a storage device, such as a microdrive or other device, to provide additional storage. Each of the components 750, 752, 764, 754, 766, and 768, may be interconnected using various buses, and several of the components may be mounted on a common motherboard or in other manners as appropriate.

Processor 752 may execute instructions within the computing device 750, including instructions stored in the memory 764. The processor may be implemented as a chipset of chips that include separate and multiple analog and digital processors. The processor may provide, for example, for coordination of the other components of the device 750, such as control of user interfaces, applications run by device 750, and wireless communication by device 750.

In some embodiments, processor 752 may communicate with a user through control interface 758 and display interface 756 coupled to a display 754. The display 754 may be, for example, a TFT LCD (Thin-Film-Transistor Liquid Crystal Display) or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may be provide in communication with processor 752, so as to enable near area communication of device 750 with other devices. External interface 762 may provide, for example, for wired communication in some implementations, or for wireless communication in other implementations, and multiple interfaces may also be used.

In some embodiments, memory 764 may store information within the computing device 750. The memory 764 can be implemented as one or more of a computer-readable medium or media, a volatile memory unit or units, or a non-volatile memory unit or units. Expansion memory 774 may also be provided and connected to device 750 through expansion interface 772, which may include, for example, a SIMM (Single In Line Memory Module) card interface. Such expansion memory 774 may provide extra storage space for device 750, or may also store applications or other information for device 750. Specifically, expansion memory 774 may include instructions to carry out or supplement the processes described above, and may include secure information also. Thus, for example, expansion memory 774 may be provide as a security module for device 750, and may be programmed with instructions that permit secure use of device 750. In addition, secure applications may be provided via the SIMM cards, along with additional information, such as placing identifying information on the SIMM card in a non-hackable manner.

The memory may include, for example, flash memory and/or NVRAM memory, as discussed below. In one implementation, a computer program product is tangibly embodied in an information carrier. The computer program product may contain instructions that, when executed, perform one or more methods, such as those described above. The information carrier may be a computer- or machine-readable medium, such as the memory 764, expansion memory 774, memory on processor 752, or a propagated signal that may be received, for example, over transceiver 768 or external interface 762.

Device 750 may communicate wirelessly through communication interface 766, which may include digital signal processing circuitry where necessary. Communication interface 766 may provide for communications under various modes or protocols, such as GSM voice calls, SMS, EMS, or MMS speech recognition, CDMA, TDMA, PDC, WCDMA, CDMA2000, or GPRS, among others. Such communication may occur, for example, through radio-frequency transceiver 768. In addition, short-range communication may occur, such as using a Bluetooth, WiFi, or other such transceiver (not shown). In addition, GPS (Global Positioning System) receiver module 770 may provide additional navigation- and location-related wireless data to device 750, which may be used as appropriate by applications running on device 750.

Device 750 may also communicate audibly using audio codec 760, which may receive spoken information from a user and convert it to usable digital information. Audio codec 760 may likewise generate audible sound for a user, such as through a speaker, e.g., in a handset of device 750. Such sound may include sound from voice telephone calls, may include recorded sound (e.g., voice messages, music files, etc.) and may also include sound generated by applications operating on device 750.

Computing device 750 may be implemented in a number of different forms, as shown in the figure. For example, it may be implemented as a cellular telephone 780. It may also be implemented as part of a smartphone 782, personal digital assistant, remote control, or other similar mobile device.

Figure 8:
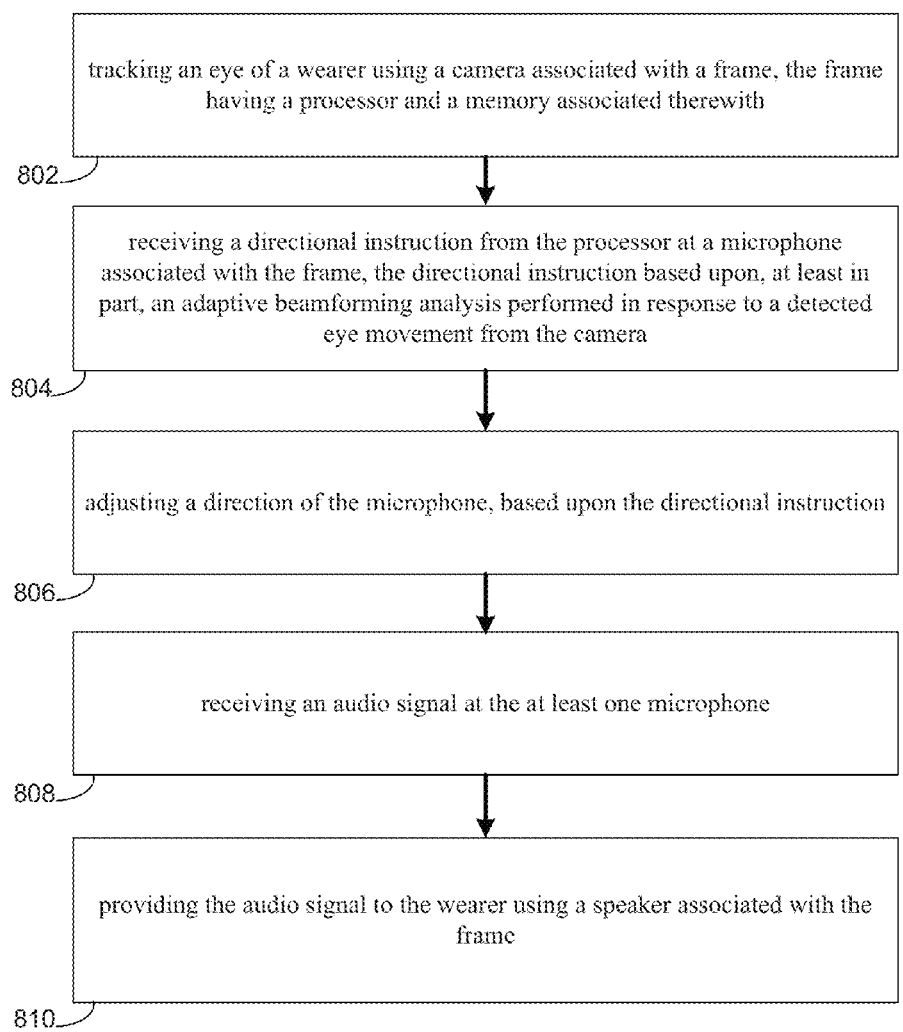
FIG. 8 is a flowchart of an acoustic beamforming process in accordance with an embodiment of the present disclosure.

Referring now to FIG. 8, an embodiment of a acoustic beamforming process 10 is provided. Process 10 may include tracking (802) an eye of a wearer using a camera associated with a frame, the frame having a processor and a memory associated therewith. Process 10 may also include receiving (804) a directional instruction from the processor at a microphone associated with the frame, the directional instruction based upon, at least in part, an adaptive beamforming analysis performed in response to a detected eye movement from the camera. Process 10 may further include adjusting (806) a direction of the microphone, based upon the directional instruction, receiving (808) an audio signal at the at least one microphone, and providing (810) the audio signal to the wearer using a speaker associated with the frame.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

As will be appreciated by one skilled in the art, the present disclosure may be embodied as a method, system, or computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present disclosure is described below with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here may be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system may include clients and servers. A client and server are generally remote from each other and typically interact through a communication network. The relationship of client and server arises by virtue of computer programs running on the respective computers and having a client-server relationship to each other.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

Having thus described the disclosure of the present application in detail and by reference to embodiments thereof, it will be apparent that modifications and variations are possible without departing from the scope of the disclosure defined in the appended claims.

What is claimed is:

1. A wearable apparatus comprising:
   a frame having a memory and processor associated therewith;
   an infrared camera associated with the frame and in communication with the processor, the infrared camera configured to track an eye of a wearer;
   at least one microphone associated with the frame, the at least one microphone configured to receive a directional instruction from the processor, the directional instruction based upon, at least in part, an adaptive beamforming analysis performed in response to a detected eye movement from the infrared camera, wherein an identification of a non-wearer of the apparatus is performed based upon detecting a pre-defined eye movement of the wearer, wherein detecting the pre-defined eye movement of the wearer triggers a setting that avoids inadvertently resetting the directional instruction if the wearer looks away from the non-wearer, wherein the at least one microphone includes a beamformer with a spatial postfilter and a model based reverberation equalizer configured to suppress reverberation at the spatial postfilter; and
   a speaker associated with the frame, the speaker configured to provide an audio signal received at the at least one microphone to the wearer only.

2. The wearable apparatus of claim 1, wherein the processor is configured to convert the audio signal to text.

3. The wearable apparatus of claim 2, further comprising:
   at least one lens configured to receive the text from the processor and to provide the text to the wearer.

4. The wearable apparatus of claim 2 wherein the memory is configured to store at least one of contact information and conversation log files based upon the converted text.

5. The wearable apparatus of claim 1, further comprising:
   a facial recognition camera associated with the frame, the facial recognition camera configured to identify the non-wearer of the apparatus.

6. The wearable apparatus of claim 1, wherein the speaker is included within at least one headphone in communication with the processor.

7. The wearable apparatus of claim 1, wherein the directional instruction is based upon, at least in part, an identification of the non-wearer of the apparatus.

8. The wearable apparatus of claim 1, further comprising:
   at least one lens configured to display visual feedback to the wearer, the visual feedback including at least one of beam shape, beam direction, and the identified non-wearer of the apparatus.

9. A method comprising:
   tracking an eye of a wearer using a camera associated with a frame, the frame having a processor and a memory associated therewith;
   receiving a directional instruction from the processor at a microphone associated with the frame, the directional instruction based upon, at least in part, an adaptive beamforming analysis performed in response to a detected eye movement from the camera, wherein an identification of a non-wearer of the apparatus is performed based upon detecting a pre-defined eye movement of the wearer, wherein detecting the pre-defined eye movement of the wearer triggers a setting that avoids inadvertently resetting the directional instruction if the wearer looks away from the non-wearer, wherein the at least one microphone includes a beamformer with a spatial postfilter and a model based reverberation equalizer configured to suppress reverberation at the spatial postfilter;
   adjusting a direction of the at least one microphone, based upon the directional instruction;

receiving an audio signal at the at least one microphone; and providing the audio signal to the wearer only using a speaker associated with the frame.

10. The method of claim 9, further comprising:
converting, using the processor, the audio signal to text.

11. The method of claim 10, further comprising:
receiving the text from the processor and providing the text to at least one lens.

12. The method of claim 10, further comprising:
storing at least one of contact information and conversation log files based upon the converted text in the memory.

13. The method of claim 9, further comprising:
identifying the non-wearer of the apparatus using a facial recognition camera associated with the frame.

14. The method of claim 9, wherein the speaker is included within at least one headphone in communication with the processor.

15. The method of claim 9, wherein the directional instruction is based upon, at least in part, the identification of a non-wearer of the apparatus.

16. The method of claim 9, further comprising:
displaying visual feedback to the wearer on at least one lens, the visual feedback including at least one of beam shape, beam direction, and the identified non-wearer of the apparatus.

17. A wearable apparatus comprising:
a frame having a memory and processor associated therewith;

an infrared camera associated with the frame and in communication with the processor, the infrared camera configured to track an eye of a wearer, wherein an identification of a target of the apparatus is performed based upon detecting a pre-defined eye movement of the wearer;

a second camera associated with the frame and in communication with the processor, the second camera configured to track a position of the target of the apparatus upon detecting the pre-defined eye movement of the wearer;

at least one microphone associated with the frame, the at least one microphone configured to receive a directional instruction from the processor based upon adaptive beamforming analysis performed by the processor and the position of the target of the apparatus, wherein the at least one microphone includes a beamformer with a spatial postfilter and a model based reverberation equalizer configured to suppress reverberation at the spatial postfilter; and a speaker associated with the frame, the speaker configured to provide an audio signal received at the at least one microphone to the wearer only.

* * * * *